United States Patent
Chang et al.

(10) Patent No.: US 6,218,752 B1
(45) Date of Patent: *Apr. 17, 2001

(54) MOTOR MOUNT ASSEMBLY FOR AN AIR CONDITIONER

(75) Inventors: Woo Sung Chang, Pusan; Nam Kyu Choi, Kunpo-shi, both of (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/320,724

(22) Filed: May 27, 1999

(30) Foreign Application Priority Data

May 27, 1998 (KR) .................................................. 98-19172

(51) Int. Cl.[7] .............................. H02K 5/00; F25B 39/04; F16M 1/00
(52) U.S. Cl. .............................. 310/91; 62/508; 248/638; 248/674; 248/676
(58) Field of Search ........................ 310/91, 51; 336/100; 62/508, 259.1, 295; 248/560, 561, 581, 604, 615, 631, 632, 639, 638, 671, 672, 674, 675, 676, 677, 678, 200

(56) References Cited

U.S. PATENT DOCUMENTS

| | | | |
|---|---|---|---|
| 852,678 | * | 5/1907 | Reist ....................................... 310/91 |
| 3,395,594 | * | 8/1968 | Blair ....................................... 310/91 |
| 3,983,429 | * | 9/1976 | Allardice ................................. 310/85 |
| 4,033,531 | * | 7/1977 | Levine ..................................... 248/16 |
| 5,417,401 | * | 5/1995 | Thompson et al. ................... 248/674 |
| 5,437,164 | * | 8/1995 | Consiglio ............................ 62/259.1 |
| 5,488,259 | * | 1/1996 | Cho ........................................ 310/91 |
| 5,629,575 | * | 5/1997 | Cazal et al. ............................ 310/91 |

* cited by examiner

*Primary Examiner*—Nestor Ramirez
*Assistant Examiner*—Dang Dinh Le

(57) ABSTRACT

A motor mount assembly comprises a base panel, and a motor mount including a U-shaped steel bracket. The bracket includes a center plate, and side plates having holes for a ventilation and connecting the motor thereto. The motor is mounted on the side plates and attached by screws to front edges of the side plates.

The side plates of the motor mount are bent from edges of the center plate. The side plates are stepped providing horizontal support surfaces for the motor.

On the center plate and the side plates, a plurality of holes for ventilation are formed.

8 Claims, 7 Drawing Sheets

MOTOR MOUNT ASSEMBLY FOR AN AIR CONDITIONER

BACKGROUND OF THE INVENTION

The present invention relates to a motor mount assembly for an air conditioner; more particularly, to a motor mount assembly integrated into an air conditioner housing.

In an air conditioner including an indoor machine portion and an outdoor machine portion, both of indoor and outdoor fans are connected to a common motor shaft.

FIG. 1 is a drawing showing a conventional motor mount assembly for an integrated air conditioner.

As shown in FIG. 1, the conventional assembly includes a base panel 1, and a motor mount 2 for mounting a motor 3, wherein a base plate 2a of the motor mount 2 is attached to the base panel 1 by four screws, and side plates 2c having two holes 2b for ventilation of the motor mount 2 are bent toward an upper direction. The motor 3 is mounted on the side plates 2c and attached perpendicular by four screws.

Further, FIG. 2 is a drawing showing another conventional motor mount assembly for an integrated air conditioner.

As shown in FIG. 2, a conventional assembly includes a base panel 1, a barrier 6 and a supporter 7 provided on the base panel 1, a motor mount 8 for mounting the motor 3 electrically welded to the supporter 7, and an indoor fan and an outdoor fan connected to a motor shaft 3a.

In addition, FIG. 3 is a drawing showing another conventional motor mount assembly for an integrated air conditioner.

As shown in FIG. 3, the conventional assembly includes a base panel 1, and a barrier 6 for mounting a motor 3 provided on the base panel 1, wherein vibroisolating rubber (not shown) is provided between the motor 3 and the barrier 6.

In the above-described conventional air conditioners, however, it is hard to support the motor on the motor mount due to its heavy weight. As a result that, a noise and vibrations are generated by the imbalance of the motor. This vibration from the motor amplifies noise from the parts by resonance. Further, the lives of bearings and elements, which are engaged with the motor shaft, are reduced by wear of the bearings, thereby generating increased noise.

SUMMARY OF THE INVENTION

It is an object of the present invention to provide a motor mount assembly for an integrated air conditioner in which a strong support of the motor mount is achieved by forming the motor mount as a U-shaped steel channel.

It is another object of the present invention to provide a quieter air conditioner by preventing vibration on the motor mount assembly.

In order to achieve the above-mentioned objects, the motor mount assembly according to the present invention comprises a motor mount assembly for an air conditioner comprising; a base panel; and a motor frame connectable to said base panel, said motor frame including, an upstanding bracket having opposed upstanding, parallel sidewalls connected by an upstanding center wall, the upstanding walls defining a substantially U-shaped chamber for accommodating a housing of the motor with a shaft of the motor extending between and parallel to said sidewalls; each of said sidewalls having a base section and a top section, a front edge of the top section being offset toward the center wall from a front edge of the base section providing a horizontal step at a top of the base section; and fasteners connecting the motor housing to said motor support.

DETAILED DESCRIPTION OF THE INVENTION

Figure 1:
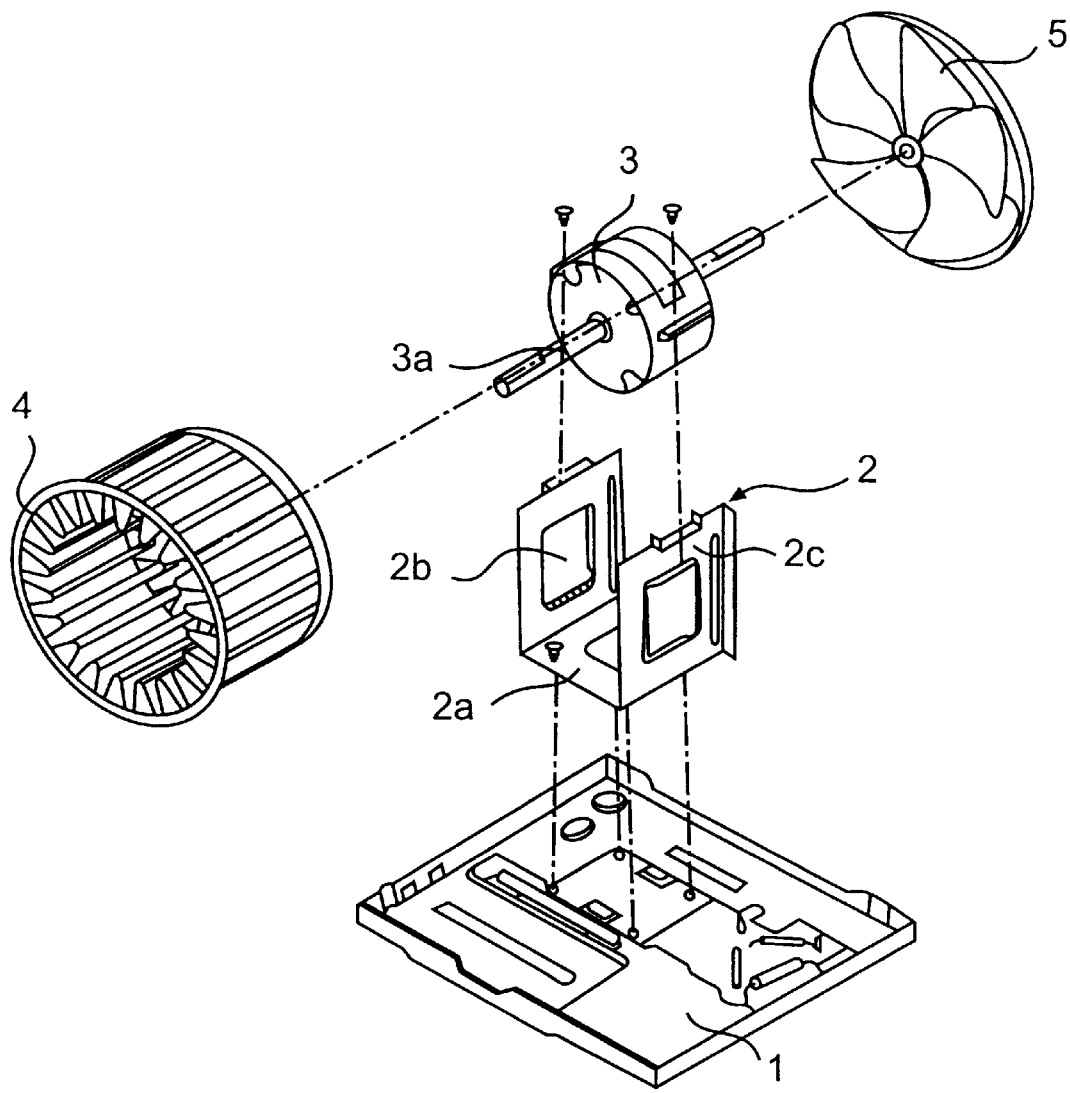
FIG. 1 is an exploded perspective view showing a conventional motor mount assembly for an integrated air conditioner.
Figure 2:
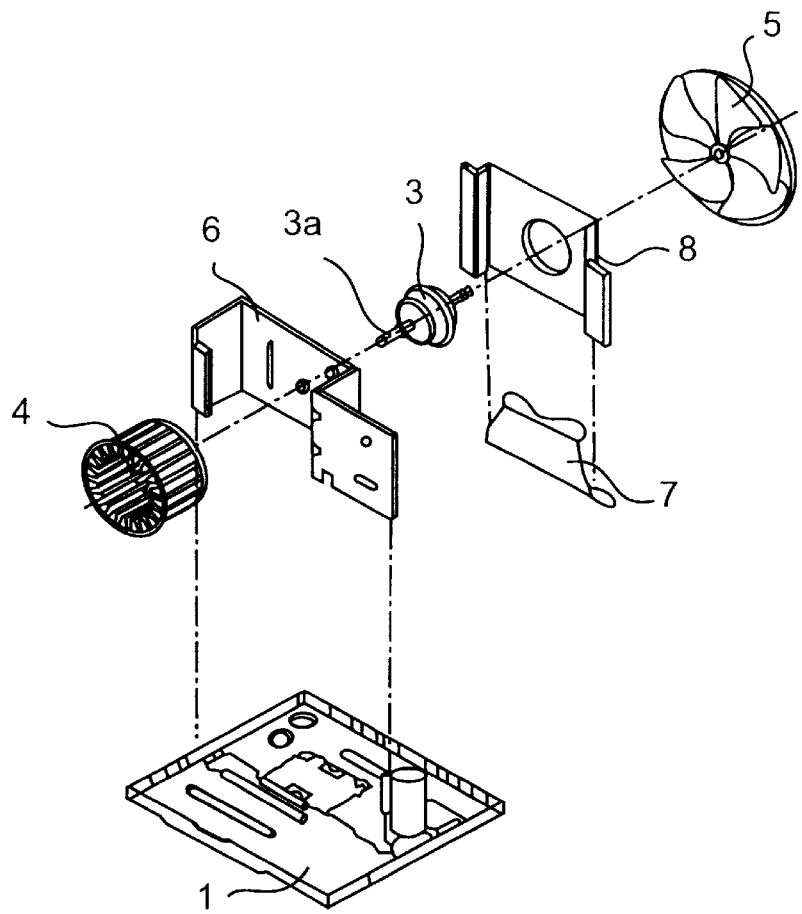
FIG. 2 is an exploded perspective view showing another conventional motor mount assembly for an integrated air conditioner.
Figure 3:
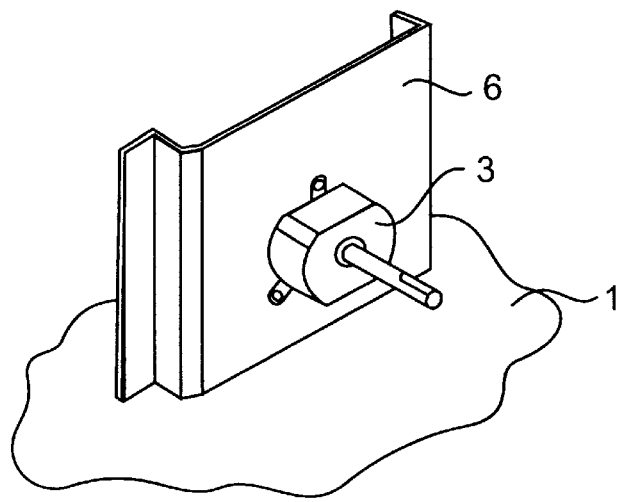
FIG. 3 is a perspective view showing further conventional fixture of motor for the integrated air conditioner.

Preferred embodiments of the present invention are described in detail hereinafter by accompanying drawings, wherein reference to the like numerals refer to like parts.

As shown in the drawings, the motor mount assembly according to the present invention comprises a base panel 10, and a motor mount 20 for mounting a motor 30, wherein the motor mount 20 is a U-shaped steel bracket and includes a center plate 21, and side plates 22 having holes for a ventilation and structure for connecting the motor 30 thereto. The motor 30 is mounted on side plates 22.

Figure 4:
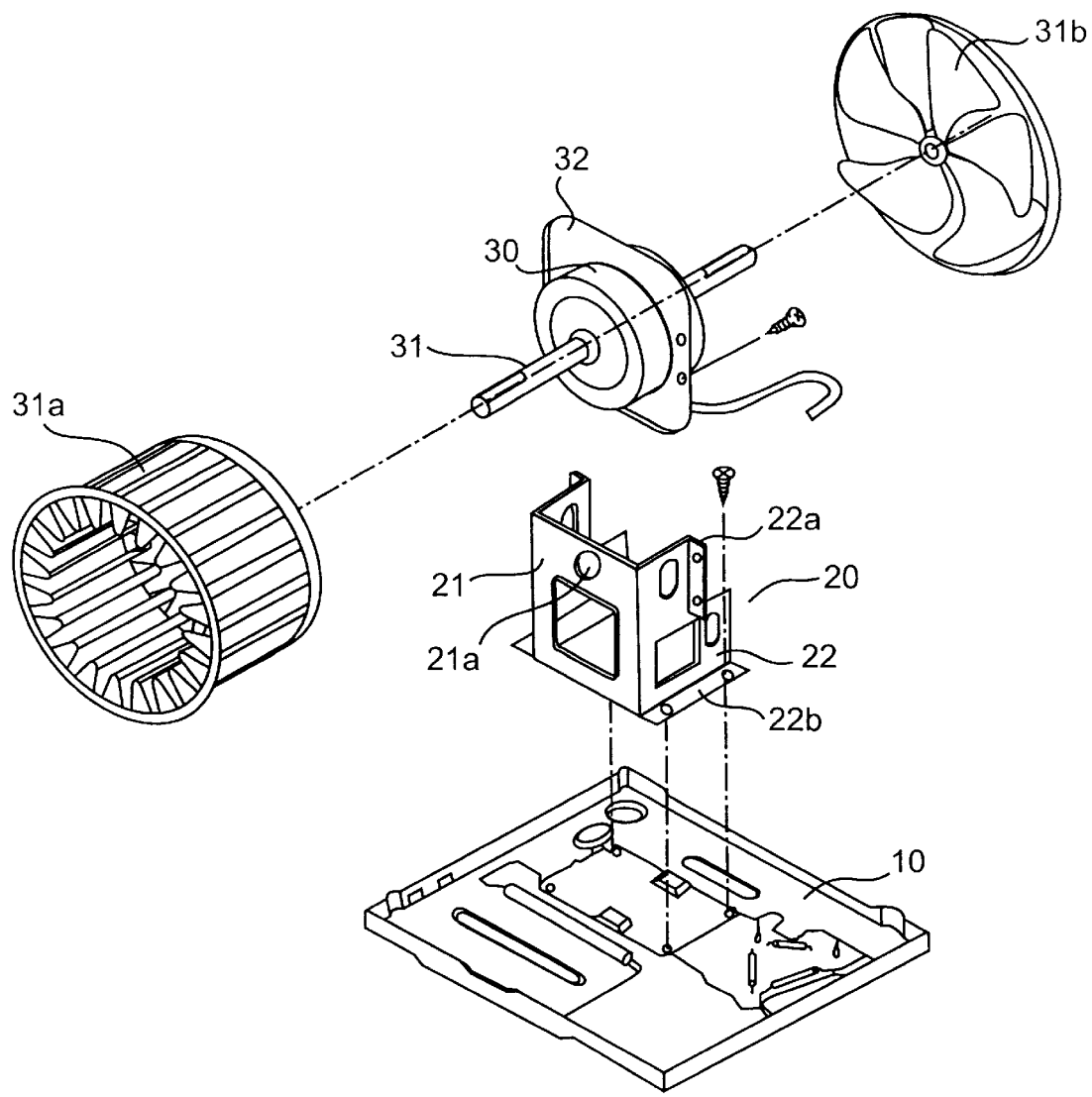
FIG. 4 is an exploded perspective view showing a motor mount assembly for an integrated air conditioner according to the present invention.
Figure 5:
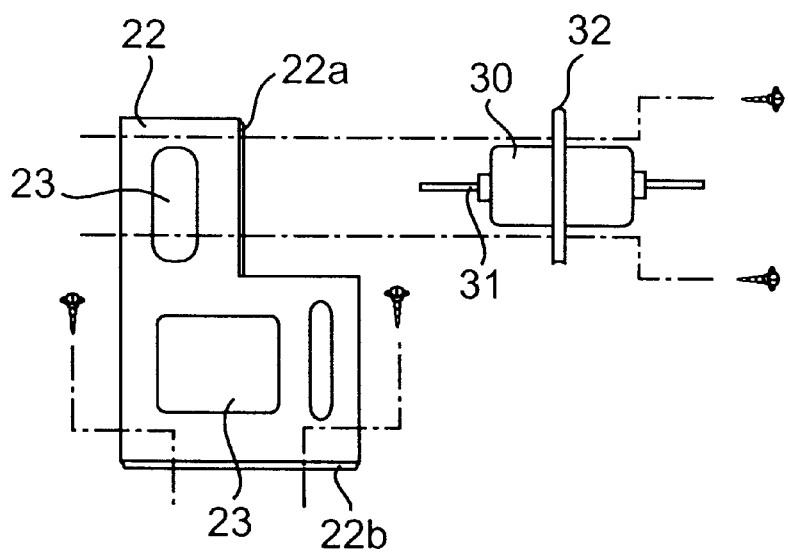
FIG. 5 is a side elevational view showing a main part of the motor mount assembly for an integrated air conditioner of FIG. 4.
Figure 6:
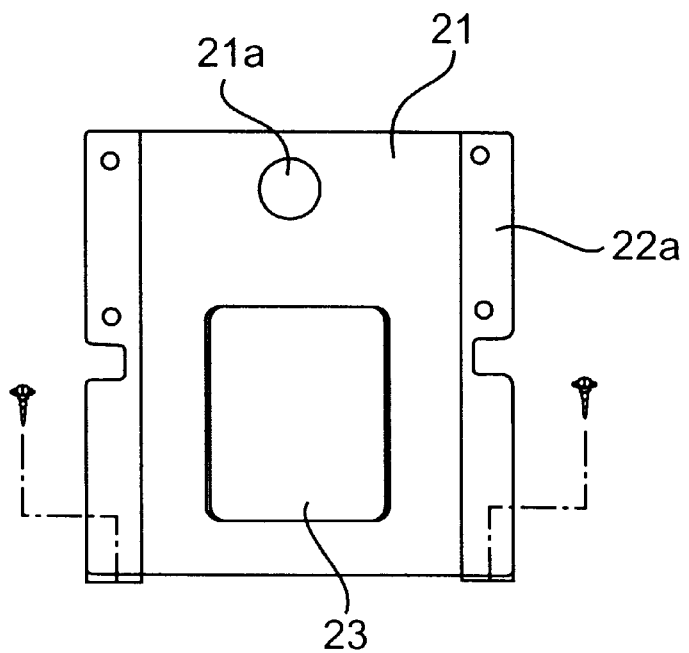
FIG. 6 is a front elevational view showing the motor mount assembly of FIGS. 4 and 5.

The side plates 22 of the motor mount 20 as shown in FIG. 4 are bent from the same sheet material which forms the center plate 21. Then the side plates 22 are flanged at 229 and 226 as shown in FIG. 5 and FIG. 6. Each plate has a lower section and an upper section, the front edge of the upper section being offset from the front edge of the lower section forming horizontal steps 22C.

On the center plate 21 and the side plates 22, a plurality of holes 23 are provided in order to facilitate ventilation.

In the motor mount 20, the motor 30 is mounted on upper flange 22a and lower flange 22b is locked with the base panel 10. At this time, a vibroisolating material is inserted between mating portion.

Both of the indoor and outdoor fans 31a, 32b are connected to the motor shaft 31.

Referring to FIGS. 4 to 6, the motor mount assembly 20 is provided securely on the base panel 10. The lower flange 22b of the motor mount 20 is secured to the base panel 10 by four screws. The motor shaft 31 is inserted into a through hole 21a on the center plate 21. A projection 32 of the motor 30 is secured to the upper flange 22a by four screws, thereby the motor 30 is supported within the U-shaped chamber in the motor mount 20.

Figure 7:
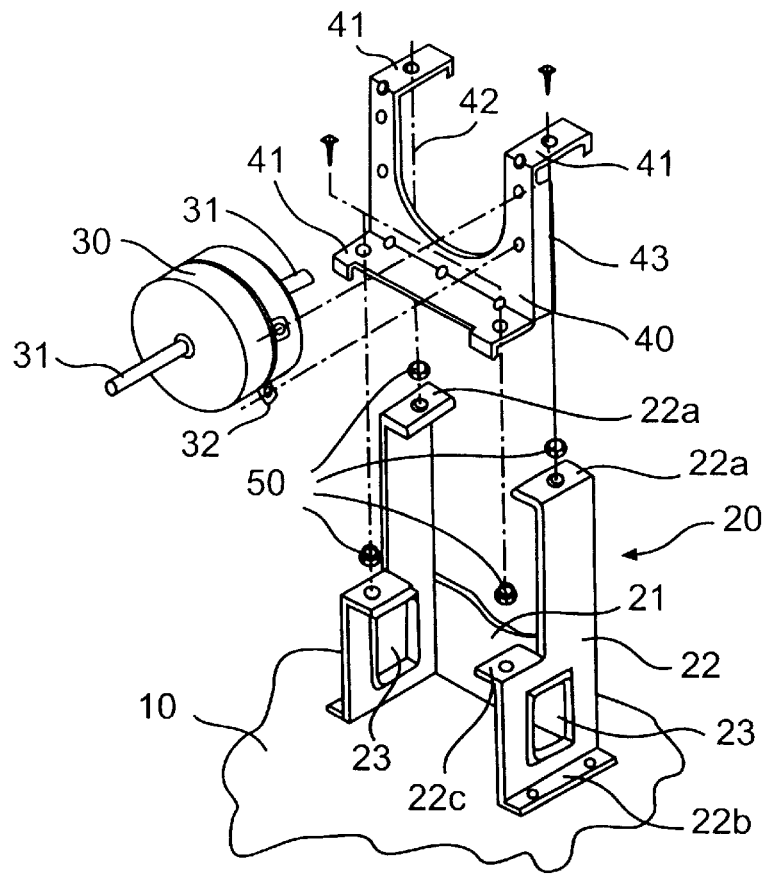
FIG. 7 is an exploded perspective view showing another embodiment of a motor mount assembly for an integrated air conditioner according to the present invention.
Figure 8:
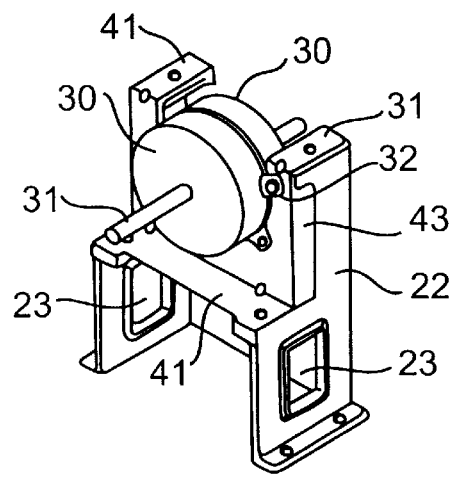
FIG. 8 is a perspective view showing a further embodiment of a motor mount assembly for an integrated air conditioner according to the present invention.

According to further aspects of the invention as shown in FIG. 7 and FIG. 8, the assembly comprises a base panel 10, a motor bracket 40 for mounting a motor 30, and a motor mount assembly 20, wherein the motor mount assembly 20 is provided as a U-shaped steel bracket and includes a center plate 21, and side plates 22 having holes for a ventilation and connecting the motor 30 thereto. The motor 30 is mounted on the motor bracket 40. The side plates 22 of the motor mount assembly 20 extend from the center plate 21 in which a plurality of holes 23 are formed in order to ventilate the motor.

In the motor mount assembly 20, the motor 30 is mounted on upper flange 22a and lower flange 22b is secured to the base panel 10.

Both of the indoor and outdoor fans are connected to a motor shaft 31. The motor bracket 40 is secured to the upper flange 22a through bracket flanges 41 by screws. In addition, guide flanges 43 are formed on the motor bracket 40 to maintain a locking force preventing the structure from vibrating and support a bending moment by a normal load.

Since the motor bracket 40 has a bracket cutout 42, larger than an outer casing of the motor 30, scattered compressed water is not flowed into holes of the motor 30. Finally, the motor 30 is locked securely with the motor bracket 40 along the direction of the motor shaft 31 by screws. At this time, a vibroisolating (resilient) material 50 is inserted between the locking portions.

Figure 9:
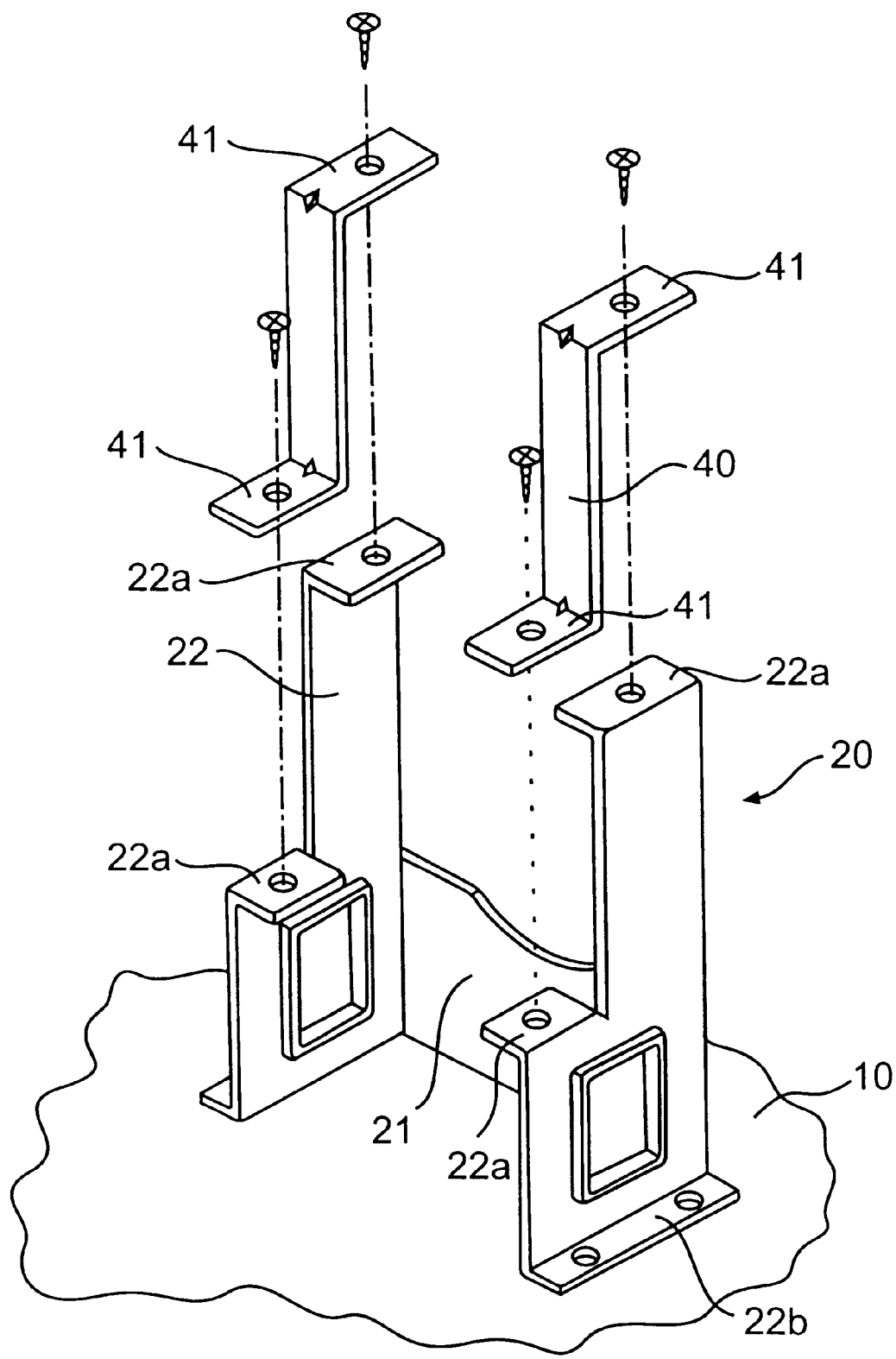
FIG. 9 is an exploded perspective view showing still another embodiment of a motor mount assembly for an integrated air conditioner according to the present invention.
Figure 10:
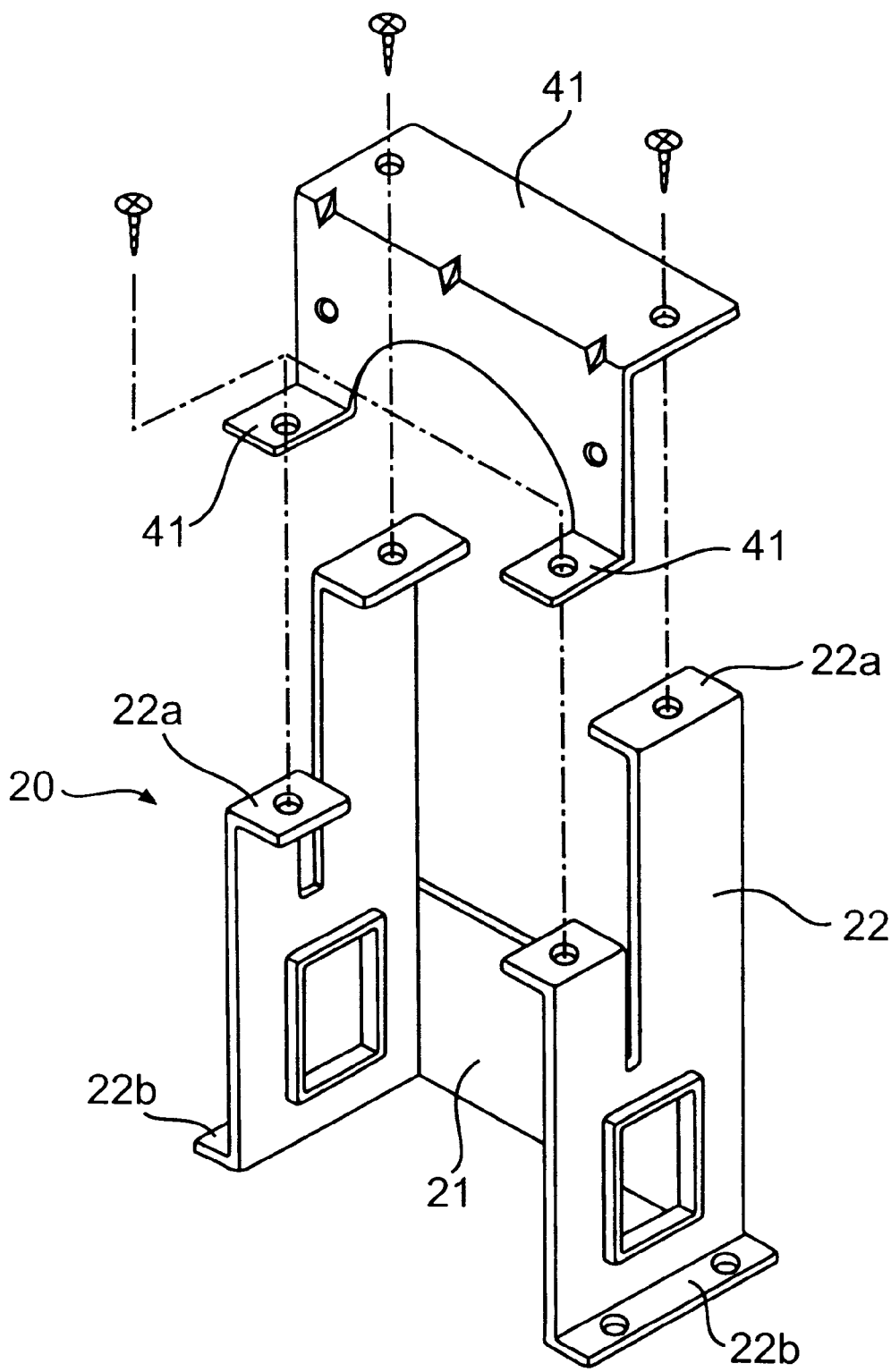
FIG. 10 is an exploded perspective view showing still a further embodiment of a motor mount assembly for an integrated air conditioner according to the present invention.

FIG. 9 and FIG. 10 represent still other embodiments of the present invention.

As shown in the drawing, the motor mount assembly comprises a base panel 10, a motor bracket 40 for mounting a motor 30, and a motor mount 20, wherein the motor mount 20 is provided as a U-shaped steel bracket and includes a center plate 21, and side plates 22 having holes for ventilation and connecting the motor 30 thereto. The motor 30 is mounted on the motor bracket 40. The side plates 22 of the motor mount 20 extend from the ends of the center plate 21 on which a plurality of holes 23 is formed in order to facilitate ventilation. Furthermore, the motor bracket 40 may be separated into two motor brackets which are secured to the side plates 22, respectively. See FIG. 9.

According to the present invention, it is possible to achieve a motor mount assembly for an integrated air conditioner providing a strong, secure support by forming the motor mount as a U-shaped steel bracket with an improved shape.

Further, it is possible to drive the air conditioner quietly by preventing vibration of the motor.

In addition, a loss of static pressure is reduced by minimizing inflow of the air for heat-radiating of the compressor through holes formed in the motor mount, and the lives of bearings and elements contacting the motor shaft, are improved by preventing wear thereof. The motor is also prevented from overheating by the improved ventilation.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A motor mount assembly for an air conditioner comprising:

a base panel; and a motor frame connectable to said base panel, said motor frame including, an upstanding bracket having opposed upstanding, parallel sidewalls connected by an upstanding center wall, the upstanding walls defining a chamber for accommodating a housing of the motor with a shaft of the motor extending between and parallel to said sidewalls;

each of said sidewalls having a base section and a top section, a front edge of the top section being offset toward the center wall from a front edge of the base section providing a horizontal step at a top of the base section;

mounting flanges on the front edges of the top sections of the sidewalls, said flanges being connectable to the motor housing; and fasteners connecting the motor housing to said motor frame at said mounting flanges.

2. A motor mount assembly for an air conditioner comprising:

a base panel; and a motor frame connectable to said base panel, said motor frame including, an upstanding bracket having opposed upstanding, parallel sidewalls connected by an upstanding center wall, the upstanding walls defining a substantially U-shaped chamber for accommodating a housing of the motor with a shaft of the motor extending between and parallel to said sidewalls;

each of said sidewalls having a base section and a top section, a front edge of the top section being offset toward the center wall from a front edge of the base section providing a horizontal step at a top of the base section;

fasteners connecting the motor housing to said motor support;

a motor bracket having a horizontal plate assembly mountable on the horizontal steps on top of the respective base sections of the sidewalls, and a vertical plate assembly extending upwardly from the horizontal plate assembly, the vertical plate assembly being connectable to the front edge of the top section of each sidewall, the vertical plate assembly having an opening for accommodating the motor housing therein.

3. The motor mount assembly of claim 2 wherein said vertical plate assembly includes two spaced plates, each of said two plates being bent to conformably engage the step and the offset front edge of the sidewall; and means for removably attaching the spaced plates to the respective steps and offset front edges of the sidewalls.

4. The motor mount assembly of claim 3 further including ventilation openings through said sidewalls.

5. The motor mount assembly of claim 3 further including resilient material between mating parts for damping vibrations.

6. The motor mount assembly of claim 2 wherein said vertical plate assembly includes a single plate bridging said sidewalls and having bent portions conformably engaging the steps and offset edges of the sidewalls, said plate having a cut-out to accommodate the motor housing.

7. The motor mount assembly of claim 2 further including ventilation openings through said sidewalls.

8. The motor mount assembly of claim 2 further including resilient material between mating parts for damping vibrations.

* * * * *